(12) United States Patent
Soma et al.

(10) Patent No.: US 8,679,234 B2
(45) Date of Patent: Mar. 25, 2014

(54) HEAVY METAL REMOVING APPARATUS AND CEMENT PRODUCTION SYSTEM

(75) Inventors: Kazuhiko Soma, Tokyo (JP); Takahiro Kawano, Tokyo (JP); Tokuhiko Shirasaka, Sakura (JP); Hidenori Isoda, Sakura (JP); Osamu Yamaguchi, Sakura (JP)

(73) Assignee: Taiheiyo Cement Corporation, Tokyo (JP)

(*) Notice: Subject to any disclaimer, the term of this patent is extended or adjusted under 35 U.S.C. 154(b) by 72 days.

(21) Appl. No.: 13/144,627

(22) PCT Filed: Jan. 22, 2009

(86) PCT No.: PCT/JP2009/051005
§ 371 (c)(1),
(2), (4) Date: Sep. 20, 2011

(87) PCT Pub. No.: WO2010/084594
PCT Pub. Date: Jul. 29, 2010

(65) Prior Publication Data
US 2011/0315055 A1    Dec. 29, 2011

(51) Int. Cl.
*B01D 45/00* (2006.01)
(52) U.S. Cl.
USPC ............ 95/267; 95/134; 95/234; 95/268; 95/14; 95/18; 55/337; 55/315.1; 55/315.2; 96/134; 96/420; 96/112; 96/126; 96/251; 96/149; 96/278; 96/366; 96/371; 96/236; 96/237; 96/238; 96/373; 96/376

(58) Field of Classification Search
USPC ........ 55/337, 315.1, 315.2; 95/134, 234, 268, 95/267, 14, 18; 96/134, 420, 112, 126, 96/251, 149, 278, 366, 371, 236, 237, 238, 96/373, 376; 106/751, 761, 762, 739, 740, 106/745; 432/14, 72, 103; 423/235, 247, 423/242.1, 243.01, 243.08, 244.01, 244.07; 422/169, 5; 110/169, 5
See application file for complete search history.

(56) References Cited

U.S. PATENT DOCUMENTS 5,264,013 A * 11/1993 Brentrup ................... 95/128
6,719,828 B1   4/2004 Lovell et al.
(Continued)

FOREIGN PATENT DOCUMENTS

EP    0519225 A1    5/1992
EP    2287126 A1    2/2011
(Continued)

OTHER PUBLICATIONS

International Search Report mailed on Mar. 10, 2009 for the corresponding International patent application No. PCT/JP2009/051005.
(Continued)

Primary Examiner — Dung H Bui
(74) Attorney, Agent, or Firm — Posz Law Group, PLC

(57) ABSTRACT

An object of the present invention is to provide a heavy metal removing apparatus which can efficiently remove the heavy metal contained in the dust produced by burning of the raw material containing the heavy metal, and a cement production system comprising the heavy metal removing apparatus. The heavy metal removing apparatus 10 comprises a cyclone separator 11 which separates exhaust gas containing the heavy metal from a part of the dust heated to a temperature equal to or more than a temperature at which the heavy metal can volatilize, a bag filter 13 which is connected to the subsequent stage of the cyclone separator 11 and separates the exhaust gas containing the heavy metal from the remainder of the dust, and a heavy metal removal tower 14 which is connected to the subsequent stage of the bag filter and removes the heavy metal from the exhaust gas.

7 Claims, 3 Drawing Sheets

(56) References Cited

U.S. PATENT DOCUMENTS

| | | | |
|---|---|---|---|
| 7,947,242 B2 * | 5/2011 | Saito et al. | 423/242.1 |
| 2009/0133607 A1 * | 5/2009 | Hansen | 106/756 |
| 2009/0169453 A1 * | 7/2009 | Saito et al. | 423/235 |

FOREIGN PATENT DOCUMENTS

| | | |
|---|---|---|
| JP | A-2001-96134 | 4/2001 |
| JP | A-2002-355531 | 12/2002 |
| JP | A-2005-097005 | 4/2005 |
| JP | A-2005-125234 | 5/2005 |
| JP | A-2006-96615 | 4/2006 |
| JP | A-2007-063027 | 3/2007 |
| JP | A-2009-30883 | 2/2009 |
| WO | WO 2006/073083 | 7/2006 |

OTHER PUBLICATIONS

Extended European Search Report issued on Oct. 4, 2012 by the European Patent Office in connection with corresponding European Patent Application No. 09838785.5-2113.

* cited by examiner

HEAVY METAL REMOVING APPARATUS AND CEMENT PRODUCTION SYSTEM

CROSS REFERENCE TO RELATED APPLICATIONS

This application is a U.S. national stage application of PCT/JP2009/051005 filed on Jan. 22, 2009.

TECHNICAL FIELD

The present invention relates to a heavy metal removing apparatus and a cement production system, and more particularly to an apparatus for removing a heavy metal contained in exhaust gas out of a cement production system.

BACKGROUND ART

In recent years, in order to promote recycling of waste materials, various types of waste materials are increasingly used as a cement raw material or burning fuel. Because some of the waste materials used as the cement raw material or the burning fuel, such as ash from incinerated general municipal wastes, various types of sludge, coal ash, displaced soil at construction, or the like, contain the heavy metal, there is concern that the amount of the heavy metal brought into the cement production system increases.

Among the heavy metals brought into a cement production process, mercury, zinc, selenium, these chlorides, etc. are volatilized at the high temperature sections (for example, a rotary kiln, a pre-heater, etc.) of the cement production system, and are contained in the exhaust gas. Then, in connection with the temperature of the exhaust gas falling, these heavy metals are deposited on the surface of the dust contained in the exhaust gas, or become the fine particles of the heavy metals and the compounds themselves.

These dust and particles are collected by a dust collector (an electrostatic precipitator, a bag filter, etc.) disposed in the exhaust gas channel of the cement production system, and removed out of the exhaust gas.

When the dust or the like collected by this means is reused as a part of the cement raw material and the burning fuel, most of the volatile heavy metals contained in the dust or the like are volatilized again at the high temperature sections of the cement production system and led again into the exhaust gas channel in a condition where it is contained in the exhaust gas.

Since the mercury among such heavy metals has high volatility and is easy to gasify in high temperature, it is hardly contained in the clinker, but is contained in the exhaust gas. Thus a part of the mercury is exhausted out of the system with the exhaust gas, but most of the mercury is to be circulated in the exhaust gas system. For this reason, if a means for removing the mercury in the exhaust gas is not equipped, the concentration of mercury in the exhaust gas becomes high gradually in accordance with the amount of mercury brought into from the cement raw material or the like increasing, and the problem that the mercury exhausted to the outside of the system increases arises.

Therefore, in order to reduce the amount of mercury in the exhaust gas in the cement production system, a method has been proposed in which the dust contained in the exhaust gas exhausted from the cement burning equipment is collected by the electrostatic precipitator or the like, the dust is then led to the heating furnace, the volatile metallic component contained in the dust is removed by heating the dust to the temperature equal to or more than the volatilization temperature of the volatile metallic component and gasifying the volatile metallic component, and the dust from which the volatile metallic component is removed is used as part of the cement raw material (refer to Patent Document 1).

[Patent Document 1] Japanese Patent Application Laid-open No. 2002-355531

DISCLOSURE OF THE INVENTION

Problem to be Solved by the Invention

However, in the method described in Patent Literature 1, there are the problems that an additional heating source is required for leading the dust to the heating furnace and heating the dust to the temperature equal to or more than the volatilization temperature of the volatile metallic component, and that the indirectly heating of the dust by the heating furnace periphery brings inefficiency in the reduction process of the amount of mercury in the exhaust gas.

Consequently, an object of the present invention is to provide a heavy metal removing apparatus which can remove efficiently the heavy metal contained in the dust produced by burning of the raw material containing the heavy metal, and a cement production system comprising the heavy metal removing apparatus.

Means for Solving the Problem

In order to solve the above mentioned problems, the present invention provides a heavy metal removing apparatus which removes a heavy metal contained in dust generated by burning of raw material containing a heavy metal, characterized by comprising, a separation apparatus which separates exhaust gas containing the heavy metal and the dust heated to a temperature equal to or more than a temperature at which the heavy metal can volatilize, and a heavy metal removal tower which removes the heavy metal from the exhaust gas separated by the separation apparatus (Invention 1).

After heating the dust and volatilizing the heavy metal contained in the dust, when the temperature of the dust falls, the heavy metal which volatilized may be deposited on the surface of the dust again. According to the above mentioned invention (Invention 1), the heated dust and the exhaust gas containing the volatilized heavy metal can be separated at the separation apparatus, only the exhaust gas containing the heavy metal can be led into the heavy metal removal tower without the volatilized heavy metal being deposited on the surface of the dust again, and the heavy metal contained in the dust can be removed efficiently.

In the above mentioned invention (Invention 1), it is preferred that the separation apparatus have a first separation unit for separating the exhaust gas and a part of the dust, and a second separation unit provided with a subsequent stage of the first separation unit for separating the exhaust gas and the remainder of the dust (Invention 2). In the invention (Invention 2), as the first separation unit, for example, a gravity dust separator, an inertial dust separator, a cyclone separator (centrifugal dust separator), or the like can be used. Among these, it is preferred to use the cyclone separator. Further, as the second separation unit, for example, an electrostatic precipitator, a bag filter (filter dust separator), or the like can be used. Among these, it is preferred to use the bag filter.

According to the above mentioned invention (Invention 2), since a part of the dust is separated and collected at the first separation unit, only the remainder of the dust can be separated and collected at the second separation unit. Thus the efficiency of separation and collection of the dust can be improved, the re-deposition of the heavy metal on the surface of the dust due to the fall of the temperature of the dust can be inhibited, and the removal efficiency of the heavy metal can be more improved.

In the above mentioned invention (Invention 2), it is preferred that the heavy metal removing apparatus further comprise a temperature adjustment unit disposed between the first separation unit and the second separation unit for adjusting the temperature of the dust to a temperature which is suitable for a separation process in the second separation unit and is equal to or more than a temperature at which the heavy metal can volatilize (Invention 3).

According to the above mentioned invention (Invention 3), since the temperature adjustment unit is disposed at the precedent stage of the second separation unit and the dust adjusted to the temperature suitable for the separation process at the second separation unit and equal to or more than the temperature at which the heavy metal can volatilize is led into the second separation unit, it is possible to reduce the load on the second separation unit and to lead only the volatilized heavy metal to the heavy metal removal tower, and hence the heavy metal can be more effectively removed.

Furthermore, the present invention provides a cement production system characterised by comprising, a pre-heater which preheats a cement raw material containing a heavy metal, a kiln which burns the cement raw material preheated at the pre-heater, a dust collection unit which collects dust in exhaust gas exhausted from the pre-heater, the heavy metal removing apparatus according to the above-described invention (Invention 2 or 3), and a duct which connects the pre-heater or a kiln back part of the kiln and the first separation unit so as to supply bleed gas bled from the pre-heater or the kiln back part of the kiln to the first separation unit, and characterised in that the dust collected by the collection unit is led to the intermediate part of the duct, and that the dust separated at the first separation unit and the second separation unit is put into the pre-heater (Invention 4).

According to the above mentioned invention (Invention 4), since the dust collected at the collection unit can be heated by the bleed gas bled from the pre-heater or the kiln back part of the kiln of the cement production system, the additional heating source is not required for volatilizing the heavy metal deposited on the surface of the dust, the heavy metal contained in the dust can be effectively removed in view of energy. In addition to this, since the dust separated and collected at the first separation unit and the second separation unit has been reduced in the concentration of the heavy metal drastically, the dust can be reused as the cement raw material and the concentration of the heavy metal in the cement production system can be reduced.

In the above mentioned invention (Invention 4), it is preferred that the bleed gas of 400 to 1100° C. bled from the pre-heater or the kiln back part of the kiln be supplied to the first separation unit via the duct (Invention 5).

According to the above mentioned invention (Invention 5), since the temperature of the bleed gas is in the above mentioned range, it is possible to effectively remove the heavy metal deposited on the surface of the dust, particularly, it is possible to effectively remove the mercury deposited on the surface of the dust.

Advantageous Effect of the Invention

According to the present invention, it is possible to provide a heavy metal removing apparatus which can remove the heavy metal contained in the dust produced by burning of the raw material containing the heavy metal, and a cement production system which comprises the heavy metal removing apparatus and can effectively remove the heavy metal contained in the exhaust gas without requiring an additional heating source.

DESCRIPTION OF THE REFERENCE NUMERALS

| | |
|---|---|
| 1: | cement production system |
| 4: | pre-heater |
| 6a: | rotary kiln (kiln) |
| 6b: | rotary kiln back part (kiln back part) |
| 8: | dust collection unit |
| 10: | heavy metal removing apparatus |
| 11: | cyclone separator (first separation unit) |
| 12: | temperature adjustment unit |
| 13: | bag filter (second separation unit) |
| 14: | heavy metal removal tower |

BEST MODE FOR CARRYING OUT THE INVENTION

A cement production system according to an embodiment of the present invention will be described with reference to the drawings.

Figure 1:
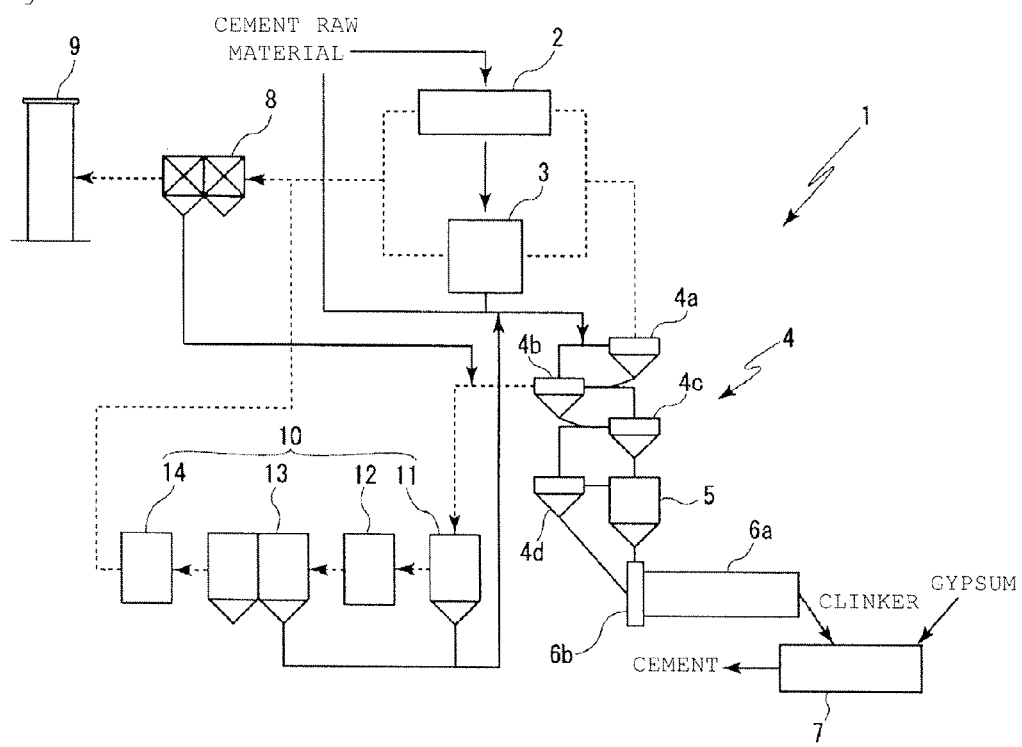
FIG. 1 is a schematic configuration diagram showing a cement production system according to an embodiment of the present invention.

FIG. 1 is a schematic diagram showing the cement production system according to the embodiment of the present invention.

As shown in FIG. 1, the cement production system 1 comprises a dryer 2 for drying cement raw material, a pulverizer 3 for pulverizing the cement raw material dried at the dryer 2, a pre-heater 4 having first to fourth cyclones 4a to 4d for preheating the cement raw material pulverized in a predetermined particle size by the pulverizer 3, a calcination furnace 5 for calcinating the cement raw material, a rotary kiln 6a for burning the raw material preheated and calcinated so as to generate clinker, a finishing mill 7 for producing a cement from the clinker generated by the rotary kiln 6a, a dust collection unit 8 for collecting the dust contained in the exhaust gas out of the rotary kiln 6a, a chimney 9 for exhausting the exhaust gas out of the cement production system 1, and a heavy metal removing apparatus 10 for removing the heavy metal contained in the exhaust gas out of the cement production system 1. Note that, in FIG. 1, the arrow indicated with a dashed line shows the flow of the exhaust gas from the pre-heater 4.

The heavy metal removing apparatus 10 comprises a cyclone separator 11 connected to the second cyclone 4b of the pre-heater 4 via the duct, a temperature adjustment unit 12 connected to the subsequent stage of the cyclone separator 11, a bag filter 13 connected to the subsequent stage of the temperature adjustment unit 12, and a heavy metal removal tower 14 connected to the subsequent stage of the bag filter 13. Note that, the intermediate part of the duct connected between the second cyclone 4b of the pre-heater 4 and the cyclone separator 11 is configured so that the collected dust collected at the dust collection unit 8 can be supplied.

Since the bleed gas bled from the second cyclone 4b and the collected dust supplied to the duct are led to cyclone separator 11, the cyclone separator 11 can take in the bleed gas with high temperature of about 650° C. and the collected dust, and can separate and collect at least a part of the collected dust (a coarse grain component, coarse grain dust).

The temperature adjustment unit 12 should be able to adjust the temperature of the bleed gas and the remainder of the collected dust (a fine grain component, fine grain dust) led to the bag filter 13 connected to the subsequent stage to a temperature which is suitable for the separation process in the bag filter 13 and is equal to or more than a temperature at which the heavy metal can volatilize. For example, it is not necessary to employ the temperature adjustment unit 12 in a case where a heat resisting ceramic filter element or the like which is possible to lead the bleed gas at a high temperature of about 650° C. is used. Since the upper limit of the operation temperature of the commonly used bag filter is about 250° C. and it is desirable to collect the dust at a high temperature as much as possible within the range of the operation temperature permitted for preventing the heavy metal existing in the bleed gas in a volatile state from adsorbing onto the fine grain dust, the temperature adjustment unit 12 should be able to adjust the temperature of the bleed gas and the remainder of collected dust to about 250 to 260° C. When the temperature of the remainder of the bleed gas and the collected dust adjusted by the temperature adjustment unit 12 exceeds 260° C., the bag filter 13 on the subsequent stage may be overloaded, and the appropriate separation process at the bag filter 13 may become difficult.

The bag filter 13 can separate and collect the remainder of the collected dust (fine grain dust) which is not separated and collected at the cyclone separator 11 and is adjusted to a predetermined temperature at the temperature adjustment unit 12. Note that it is preferred that the bag filter 13 have heat resistance with respect to the temperature equal to or more than the volatilization temperature of the heavy metal (for example, a temperature of equal to or more than 250° C.) so that the heavy metal volatilized from the collected dust is led into the heavy metal removal tower 14 as remaining the volatilized state. In such a point of view, it is preferred that the filter made from the glass fiber, the filter made from Teflon (registered trademark) or the like, which is capable of using under the temperature equal to or more than 250° C., be used as the bag filter 13.

The heavy metal removal tower 14 should be able to remove the heavy metal existing in the bleed gas in a volatile state. Examples of the heavy metal removal tower 14 include an apparatus consisting of an activated carbon absorption tower filled up with an activated carbon or the like. The activated carbon absorbed at the activated carbon absorption tower can be reused by heating. Note that the exhaust gas obtained by heating of the activated carbon should be cleaned at the spray tower. The cleaned exhaust gas is led to a tower for collecting heavy metals in gases. A cleaning solution after controlling its pH should be subjected to a tower for collecting heavy metals in aqueous solutions. The solution after heavy metals are removed should be subjected to a wastewater treatment equipment and then the solution can be discarded.

Note that the heavy metal removal tower 14 may be an apparatus filled up with the metal (amalgam formation metal) which can react to the heavy metal instead of the activated carbon, and may be an apparatus filled up with the absorption material supporting the amalgam formation metal instead of them, or may be an apparatus filled with a combination of them.

As the metal which can react to the heavy metal (mercury or the like), for example, metals which form amalgam, such as gold, silver, copper, zinc, and aluminum, or the like can be used conveniently. When filling up the heavy metal removal tower 14 with these metals, examples of the form of the metal include the grain form, the coiled form, the fibrous form, the belle saddle form, the Raschig ring form, the honeycomb form, etc. Especially, the honeycomb form is desirable among these, since the pressure loss of the gas flowing through the heavy metal removal tower 14 can be reduced.

The fill ration of the absorption materials (activated carbon, amalgam formation metal, and adsorption material supporting amalgam formation metal) in the heavy metal removal tower 14 are preferably 10 times or more by a mole ratio of the amount of the heavy metal to be processed, if the ration is 100 times or more, the removal efficiency of the heavy metal can bring marked improvement.

In the cement production system 1, the cement raw material which partly includes a cement raw material containing the waste product containing the heavy metal is dried at the dryer 2 if needed. Examples of the waste product containing the heavy metal include, not to be considered to be limited to the followings, soil containing heavy metals, fly ash, blast furnace secondary ashes, aches from municipal incinerators, and sewage sludge.

The heavy metal contained in the waste product is not limited especially. Examples of the heavy metal include volatile heavy metals, such as mercury, selenium, cadmium, and zinc, and volatile heavy metal compounds such as chlorides of the aforementioned heavy metals.

In the cement production system 1, the cement raw material, which has been dried at the dryer 2 if needed, is fed into the pulverizer 3, and is pulverized to a predetermined particle size. The pulverized cement raw material undergoes the first cyclone 4a of the pre-heater 4, the second cyclone 4b, the third cyclone 4c, the calcination furnace 5, the fourth cyclone 4d, and the rotary kiln 6a in this order, and the pulverized cement is burned at the rotary kiln 6a.

The exhaust gas out of the rotary kiln 6a while the cement raw material is burned at the rotary kiln 6a passes through the calcination furnace 5, the fourth cyclone 4d to the first cyclone 4a of the pre-heater 4, the pulverizer 3, or the dryer 2, and the exhaust gas is then led into the dust collection unit 8 (refer to the dashed line arrow in FIG. 1).

The heavy metal contained in the cement raw material volatilizes and remains in the exhaust gas out of the pre-heater 4, and the dust is contained in the exhaust gas. The heavy metal is deposited on the surface of the dust in accordance with the decline of the temperature of the exhaust gas. Specifically, the temperature of the exhaust gas out of the pre-heater 4 is about 100 to 150° C. in the dust collection unit 8, and most of the heavy metal is then to be deposited on the surface of the dust.

The dust (collected dust) collected at the collection unit 8 is lead into the duct connected between the second cyclone 4b of the pre-heater 4 and the cyclone separator 11. The collected dust led into the duct is then led into the cyclone separator 11 while being heated by the bleed gas which is bled from the second cyclone 4b and flows in the duct. The collected dust is continuously heated in the cyclone separator 11.

The temperature of the bleed gas is about 650° C. and this temperature is equal to or more than a temperature at which the heavy metal can volatilize. The heavy metal deposited on the surface of the collected dust therefore volatilizes into the bleed gas by heating the collected dust with the bleed gas. Note that the amount of the bleed gas should be about 1/10 of the whole amount of the exhaust gas discharged from the second cyclone 4b. If it is the amount of this degree, the collected dust can sufficiently be heated in order to volatilize the heavy metal from the collected dust. Furthermore, since the amount of the exhaust gas (bleed gas) to be processed can be reduced and the mercury concentration in the exhaust gas (bleed gas) can be made more into high concentration, the heavy metal can be more efficiently removed.

A part of the collected dust (coarse grain dust) is separated and collected at the cyclone separator 11, and the remainder of the collected dust (fine grain dust), which is not separated and collected with the cyclone separator 11, and the bleed gas are led into the temperature adjustment unit 12. Then the remainder and the bleed gas are led into the bag filter 13 after heated to a temperature which is suitable for the dust collection process in the bag filter 13 and is equal to or more than a temperature at which the heavy metal can volatilize.

The bleed gas and the fine grain dust the temperature of which are adjusted in the temperature adjustment unit 12 are led into the bag filter 13, the fine grain dust is separated and collected at the bag filter 13, and then the bleed gas is led into the heavy metal removal tower 14. Thereby, the heavy metal existing in the bleed gas in a volatility state is absorbed and removed at the heavy metal removal tower 14.

The bleed gas which is discharged out of the heavy metal removal tower 14 and from which the heavy metal is removed is led into the dust collection unit 8 via the exhaust gas flow path, and is then exhausted out of the chimney 9. The bleed gas from which the heavy metal is removed can be exhausted as it is, since the mercury concentration in the exhaust gas is low enough.

As explained above, the cement production system 1 according to the present embodiment can volatilize the heavy metal deposited on the surface of the collected dust by heating the collected dust collected at the dust collection unit 8. The re-deposition of the heavy metal to the surface of the collected dust due to the decline of the temperature of the collected dust is prevented and the heavy metal in the bleed gas can be removed by a method in which the coarse grain component of the collected dust is separated and collected at the cyclone separator 11, the temperature of the fine grain component of the collected dust is adjusted, and the fine grain dust is then separated and collected at the bag filter 13 after the temperature adjustment.

In addition, since the collected dust collected at the dust collection unit 8 is heated by the bleed gas out of the second cyclone 4b, an additional heating source for volatilizing and removing the heavy metal is not required, and hence the heavy metal can be effectively removed in view of energy.

Furthermore, since the amount of the bleed gas out of the second cyclone 4b is about 1/10 of the amount of the exhaust gas from the cement production system 1, the heavy metal concentration in the exhaust gas can be high, and the heavy metal can be efficiently removed in comparison with the conventional cement production system.

The heavy metal concentration in the dust separated and collected at the cyclone separator 11 and the bag filter 13 is drastically reduced. Therefore, even if it uses the dust as the cement raw material again, the heavy metal concentration in the system of the cement production system 1 can be reduced.

The embodiment described hereinabove have been presented for easy understanding of the present invention and are not intended to limit the present invention. Accordingly, the respective elements disclosed in the foregoing embodiment shall be construed to cover all design modifications and equivalents that fall within the technical scope of the invention.

In the above mentioned embodiment, the temperature adjustment unit 12 is disposed between the cyclone separator 11 and the bag filter 13, and the temperature of the heated collected dust is adjusted to a temperature which is suitable for the separation process at the bag filter 13 and at which the heavy metal in the collected dust can volatilize. However, in a case where the separation unit has the heat resistance of about 400 to 600° C. as the bag filter 13, the temperature adjustment unit 12 may not need to be installed.

In addition, in the above mentioned embodiment, the heavy metal removing apparatus 10 comprises two separation units (the cyclone separator 11 and the bag filter 13). However, the apparatus 10 can comprise one separation unit which can separate the dust from the exhaust gas and collect all the dust. In this case, a bag filter being able to separate and collect the dust smaller in the grain size, an electrostatic precipitator, etc. can be used.

Furthermore, in the above mentioned embodiment, the collected dust is heated by the bleed gas with the temperature of about 650° C. bled from the second cyclone 4b. However, the dust may be heated by bleed gas bled from the other sections (for example, the third cyclone 4c, the fourth cyclone 4d, the calcination furnace 5, the rotary kiln back part 6b, etc.) of the cement production system 1, as long as the object of volatilizing the heavy metal is achieved. In this case, the temperature of the bleed gas may be about 400 to 1100° C., the temperature of about 500 to 600° C. is preferable in particular. It may be difficult to sufficiently volatilize the heavy metal if the temperature is less than 400° C., and it is difficult to bleed the gas if the temperature is over 1100° C.

EXAMPLES

Below, examples will be used to explain the present invention more specifically, but the present invention is not limited to these examples below.

Example 1

Figure 2:
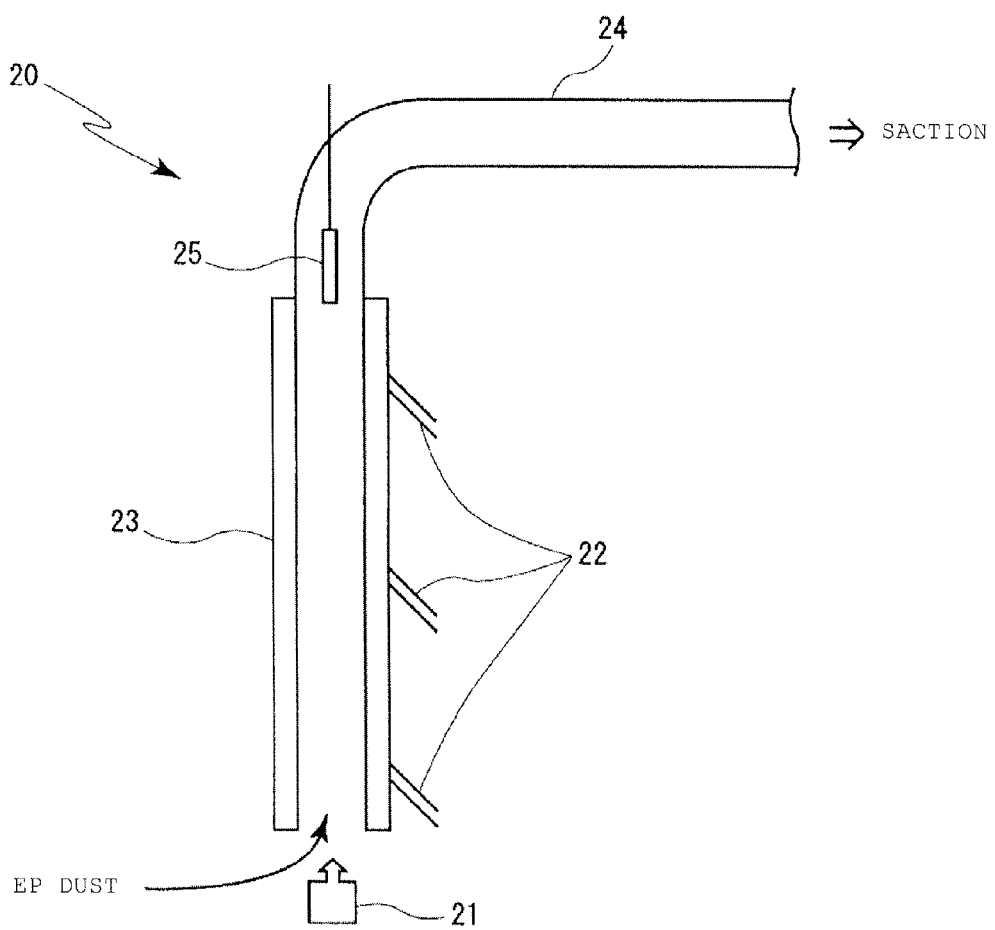
FIG. 2 is a schematic configuration diagram showing an air flow heating apparatus in Example 1 of the present invention.

The Hg (mercury) concentration (mg/kg) in EP dust was measured using the air flow-heating experimental apparatus shown in FIG. 2. The air flow-heating experimental apparatus 20 comprises a heating tube 23 having a jet heater (manufactured by LEISTER TECHNOLOGIES KK, product name: LEISTER HOT AIR BLOWER HOTWIND TYPE S) 21 and a plurality of heating burners 22, a cooling tube 24 connected to the one end portion of the heating tube 23, and a probe for collecting the EP dust 25 which has a paper filter and is provided with the connection portion between the heating tube 23 and cooling tube 24. In the air flow-heating experimental apparatus 20, the EP dust supplied from the other end portion of the heating tube 23 moves in the heating tube 23 while the EP dust is heated by the suction via the cooling tube 24, and the EP dust is collected at the paper filter of the probe for collecting the EP dust 25 by the suction via the probe 25. Note that the Hg concentration (mg/kg) in the EP dust after heating was measured using the heat vaporization atomic absorption spectrophotometers (manufactured by Nippon Instruments Corporation Co., Ltd., product name: SP-3D and RD-3).

Note that, as the EP dust used for this measurement, the EP dust collected by an electrostatic precipitator (EP) of the existing cement production apparatus was used where the Hg concentration in the EP dust was 12.8 mg/kg. Furthermore, the heating temperatures were set to 400° C., 500° C. and 600° C., and the heating times were set to 2 seconds, 4 seconds and 6 seconds.

Figure 3:
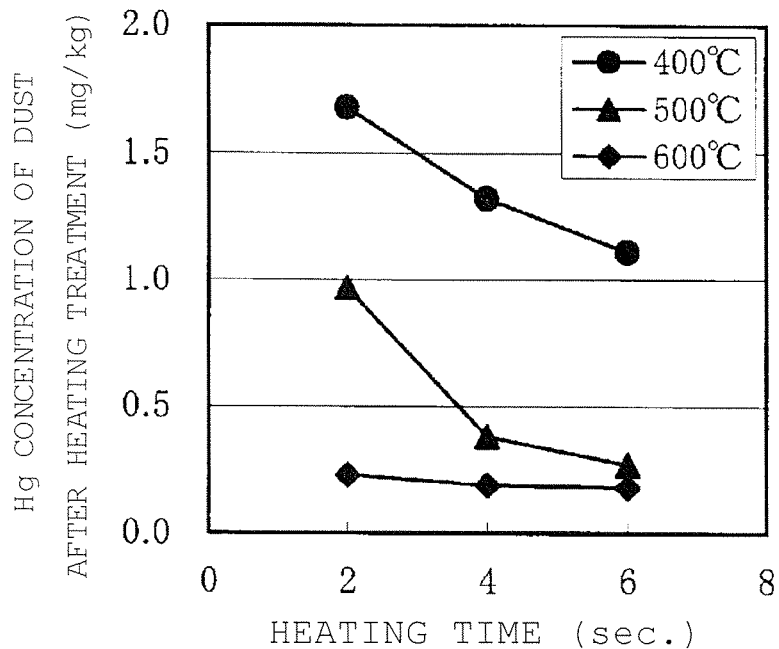
FIG. 3 is a graph showing the relation between the dust Hg concentration (mg/kg) after the heat process and the heating time (sec.) in Example 1 of the present invention.
Figure 4:
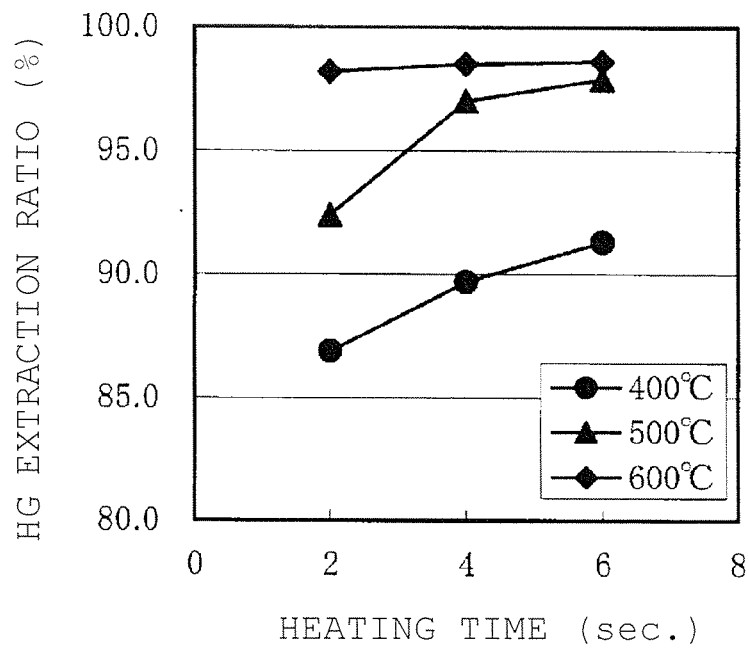
FIG. 4 is a graph showing the relation between the Hg extraction ratio (%) and the heating time (sec.) in Example 1 of the present invention.

The measurement result is shown in Table 1, FIG. 3 and FIG. 4.

TABLE 1

| Heating temperature (° C.) | Heating time (sec.) | Hg concentration in dust after heating process (mg/kg) | Hg extraction ratio (%) |
|---|---|---|---|
| 400 | 2 | 1.68 | 86.9 |
|  | 4 | 1.32 | 89.7 |
|  | 6 | 1.11 | 91.3 |
| 500 | 2 | 0.97 | 92.4 |
|  | 4 | 0.38 | 97.0 |
|  | 6 | 0.27 | 97.9 |
| 600 | 2 | 0.23 | 98.2 |
|  | 4 | 0.19 | 98.5 |
|  | 6 | 0.18 | 98.6 |

As shown in Table 1, FIG. 3 and FIG. 4, it was validated that 85% or more of the Hg in the dust could be volatilized by heating at a temperature of 400° C. or more for 2 seconds or more, and that 90% or more of the Hg in the dust could be volatilized by heating for 6 seconds or more. Furthermore, it was validated that 98% or more of the Hg in the dust could be volatilized by heating at a temperature of 600° C. or more without being influenced by heating time.

Example 2

The air flow-heating experimental apparatus 20 used in Example 1 was used in a condition in which the heating temperature was set to 600° C. and the Hg concentration in the cooling tube (250° C.) was measured by a method similar to the method in Example 1.

The measurement result is shown in Table 2.

TABLE 2

| Heating temperature (° C.) | Temperature at cooling tube (° C.) | Hg concentration (mg/kg) | Hg extraction ratio (%) |
|---|---|---|---|
| 600 | 250 | 2.33 | 81.8 |

As shown in Table 2, it was validated that the 80% or more of Hg could be volatilized even in a case where the EP dust was first heated to 600° C. and then reduced to 250° C. by the cooling tube 24. From this result, it is thought that 80% or more of Hg in a collected dust can be removed by a process in which the collected dust is heated by the bleed gas of about 650° C. from the second cyclone 4b of the cement production system 1 shown in FIG. 1, the temperature of the collected dust is decreased to about 250° C. at the temperature adjustment unit 12, and then the process with the bag filter 13 and the heavy metal removal tower 14 are performed.

INDUSTRIAL APPLICABILITY

The heavy metal removing apparatus of the present invention is useful in reducing the concentration of a heavy metal in the system of a cement production system, especially in reducing the concentration of mercury.

The invention claimed is:

1. A mercury removing apparatus for removing mercury contained in dust, the dust collected by a dust collection unit of a cement production apparatus, the dust collection unit collecting dust from exhaust gas passing through an exhaust gas path, and the dust collection unit connected to the exhaust gas path downstream from s kiln that burns a cement raw material containing the mercury, the apparatus comprising:
   a separation apparatus receiving heated dust, which is the dust from the dust collection unit that is heated by gas at 400 to 1000 ° C. bled from the cement production apparatus, and separating a bleed gas containing the mercury from the heated dust, and
   a mercury removal tower which removes the mercury from the bleed gas containing the mercury separated by the separation apparatus.

2. The mercury removing apparatus according to claim 1, wherein the separation apparatus has a first separation unit for separating the exhaust gas and a part of the dust, and a second separation unit provided with a subsequent stage of the first separation unit for separating the exhaust gas and the remainder of the dust.

3. The mercury removing apparatus according to claim 2, further comprising a temperature adjustment unit disposed between the first separation unit and the second separation unit for adjusting the temperature of the dust to a temperature which is suitable for a separation process in the second separation unit and is equal to or more than a temperature at which the mercury can volatilize.

4. A cement production system comprising,
   a pre-heater which preheats a cement raw material containing
   a heavy metal,
   a kiln which burns the cement raw material preheated at the pre-heater,
   a dust collection unit which collects dust in exhaust gas exhausted from the pre-heater,
   a heavy metal removing apparatus comprising:
      a separation apparatus which separates exhaust gas containing the heavy metal and the dust heated to a temperature equal to or more than a temperature at which the heavy metal can volatilize, the separation apparatus having:
         a first separation unit for separating the exhaust gas and a part of the dust. and
         a second separation unit provided with a subsequent stage of the first separation unit for separating the exhaust gas and the remainder of the dust, and
      a heavy metal removal tower which removes the heavy metal from the exhaust gas separated by the separation apparatus, and
   a duct which connects the pre-heater or a kiln back part of the kiln and the first separation unit, and supplies bleed gas bled from the pre-heater or the kiln back part of the kiln to the first separation unit, wherein the dust collected by the collection unit is led to an intermediate part of the duct and the dust separated at the first separation unit and the second separation unit is put into the pre-heater.

5. The cement production system according to claim 4, wherein the bleed gas of 400 to 1100 ° C bled from the pre-heater or the kiln back part of the kiln is supplied to the first separation unit via the duct.

6. A cement production system comprising,
   a pre-heater which preheats a cement raw material containing a heavy metal,
   a kiln which burns the cement raw material preheated at the pre-heater,
   a dust collection unit which collects dust in exhaust gas exhausted from the pre-heater, a heavy metal removing apparatus comprising:
  a separation apparatus which separates exhaust gas containing the heavy metal and the dust heated to a temperature equal to or more than a temperature at which the heavy metal can volatilize, the separation apparatus having:
    a first separation unit for separating the exhaust gas and a part of the dust, and
    a second separation unit provided with a subsequent stage of the first separation unit for separating the exhaust gas and the remainder of the dust,
  a temperature adjustment unit disposed between the first separation unit and the second separation unit for adjusting the temperature of the dust to a temperature which is suitable for a separation process in the second separation unit and is equal to or more than a temperature at which the heavy metal can volatilize, and
  a heavy metal removal tower which removes the heavy metal from the exhaust gas separated by the separation apparatus, and
  a duct which connects the pre-heater or a kiln back part of the kiln and the first separation unit, and supplies bleed gas bled from the pre-heater or the kiln back part of the kiln to the first separation unit, wherein the dust collected by the collection unit is led to an intermediate part of the duct and the dust separated at the first separation unit and the second separation unit is put into the pre-heater.

7. The cement production system according to claim 6, wherein the bleed gas of 400 to 1100 ° C. bled from the pre-heater or the kiln back part of the kiln is supplied to the first separation unit via the duct.

* * * * *